US010986330B2

(12) United States Patent
Dashwood

(10) Patent No.: US 10,986,330 B2
(45) Date of Patent: Apr. 20, 2021

(54) METHOD AND SYSTEM FOR 360 DEGREE HEAD-MOUNTED DISPLAY MONITORING BETWEEN SOFTWARE PROGRAM MODULES USING VIDEO OR IMAGE TEXTURE SHARING

(71) Applicant: Apple Inc., Cupertino, CA (US)

(72) Inventor: Timothy Dashwood, Hamilton (CA)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 15/485,804

(22) Filed: Apr. 12, 2017

(65) Prior Publication Data
US 2017/0295361 A1 Oct. 12, 2017

Related U.S. Application Data

(60) Provisional application No. 62/321,236, filed on Apr. 12, 2016.

(30) Foreign Application Priority Data

Apr. 12, 2016 (CA) .................................. 2927046

(51) Int. Cl.
*H04N 13/00* (2018.01)
*H04N 13/344* (2018.01)
*G06F 3/0481* (2013.01)
*G06F 3/01* (2006.01)
*G06T 1/20* (2006.01)

(52) U.S. Cl.
CPC .......... *H04N 13/344* (2018.05); *G06F 3/012* (2013.01); *G06F 3/04815* (2013.01); *G06T 1/20* (2013.01); *G06F 3/0481* (2013.01)

(58) Field of Classification Search
None
See application file for complete search history.

(56) References Cited

U.S. PATENT DOCUMENTS

| 2005/0270265 A1* | 12/2005 | Plut | G09G 5/00 345/102 |
| 2011/0032330 A1* | 2/2011 | Kim | G09G 3/003 348/43 |
| 2015/0161762 A1* | 6/2015 | Fujiwara | G06T 11/60 345/633 |

(Continued)

OTHER PUBLICATIONS

"MacVoices #15114: SuperMeet—Tim Dashwood Takes Us into The World of Editing for Virtual Reality," Uploaded to vimeo by MacVoices on May 11, 2015, retrieved from the Internet: URL: https://vimeo.com/127493858.

(Continued)

*Primary Examiner* — Carl Adams
(74) *Attorney, Agent, or Firm* — Blank Rome LLP

(57) ABSTRACT

Presenting an image preview includes receiving image data from a GPU buffer, wherein the GPU buffer is associated with a media manipulation application, obtaining an orientation data for a display device, rendering a preview image using the image data and the orientation data, and displaying the preview image using the display device, wherein the preview image is displayed while the image data is utilized by the media manipulation application, and wherein the preview image is dynamically modified when the image data is modified by the media manipulation application.

20 Claims, 6 Drawing Sheets

(56) References Cited

U.S. PATENT DOCUMENTS

2015/0264267 A1* 9/2015 Park ............... H04N 5/232945
348/333.02
2016/0148417 A1* 5/2016 Kim ................. G06T 19/006
345/419

OTHER PUBLICATIONS

"Meet the Makers of Google Street View and Learn About Their Immersive Video Platform," Published to YouTube by No Film School on Apr. 18, 2015, retrieved from the Internet: URL: http://nofilmschool.com/2015/04/meet-makers-google-street-view-learn-about-their-immersive-video-platform and https://www.youtube.com/watch?v=H-ps7aLJO7w.

Damm, Ryan, "Virtual reality plugins for programs like Final Cut Pro enable you to make live action VR . . . Now!," Apr. 23, 2015, retrieved from the Internet: URL: http://uploadvr.com/virtual-reality-plugins-for-programs-like-final-cut-pro-enable-you-to-make-live-action-vr-now.

\* cited by examiner

| 270 APPLICATION A | 271 PHOTO | 272 Finance | 273 MOVIE | 274 APPLICATION B |
|---|---|---|---|---|
| 275 | | | | |

| 260 OTHER APPLICATION SERVICES | 261 SPRITE KIT | 262 SCENE KIT | 263 CORE ANIMATION | 264 CORE GRAPHICS |
|---|---|---|---|---|
| 280 | | | | |

| 250 O/S SERVICES | 251 OPENGL | 252 METAL | 253 SOFTWARE RAYTRACER | 254 SOFTWARE RASTERIZER |
|---|---|---|---|---|
| 285 | | | | |

O/S KERNEL 245 — 290

HARDWARE 240 — 295

*FIG. 2*

METHOD AND SYSTEM FOR 360 DEGREE HEAD-MOUNTED DISPLAY MONITORING BETWEEN SOFTWARE PROGRAM MODULES USING VIDEO OR IMAGE TEXTURE SHARING

BACKGROUND

The present application generally relates to monoscopic (1 view) or stereoscopic (2 view) 180 degree (hemisphere) or 360 degree (full sphere) photography and post-production for distribution to dome, mobile or head-mounted display virtual reality applications.

Conventional 180 degree or 360 degree video and/or images are stored in flat storage formats using equirectangular or cubic projections to represent spherical space. If these videos and/or images are edited in conventional editing or graphics applications, it is difficult for the user to interpret the experience of the final result when the video or images are distributed and presented in a dome projection, cubic, or mapped spherically within a virtual reality head-mounted display. Editing and manipulating such images in these flat projections requires special skill and much trial and error.

Further, it is not an uncommon experience to realize after manipulation of images or videos composited or edited with spherical that subsequent shots are misaligned, or stereoscopic parallax points do not match in a natural way.

SUMMARY

Various embodiments disclosed in herein are generally directed to methods and systems for transmitting monoscopic or stereoscopic 180 degree or 360 degree still or video images from a host editing or visual effects software program as equirectangular projection, or other spherical projection, to the input of a simultaneously running software program on the same device that can continuously acquire the orientation and position data from a wired or wirelessly connected head-mounted display's orientation sensors, and simultaneously render a representative monoscopic or stereoscopic view of that orientation to the head mounted display, in real time.

In one embodiment, a method for presenting an image preview is described. The method may include receiving image data from a GPU buffer, wherein the GPU buffer is associated with a media manipulation application, obtaining an orientation data for a display device, rendering a preview image using the image data and the orientation data, and displaying the preview image using the display device, wherein the preview image is displayed while the image data is utilized by the media manipulation application, and wherein the preview image is dynamically modified when the image data is modified by the media manipulation application.

In another embodiment, the method may be embodied in computer executable program code and stored in a non-transitory storage device. In yet another embodiment, the method may be implemented in an electronic device having image capture capabilities.

BRIEF DESCRIPTION OF THE DRAWINGS

FIG. 2 shows an illustrative software layer and architecture diagram.

DETAILED DESCRIPTION

Figure 1:
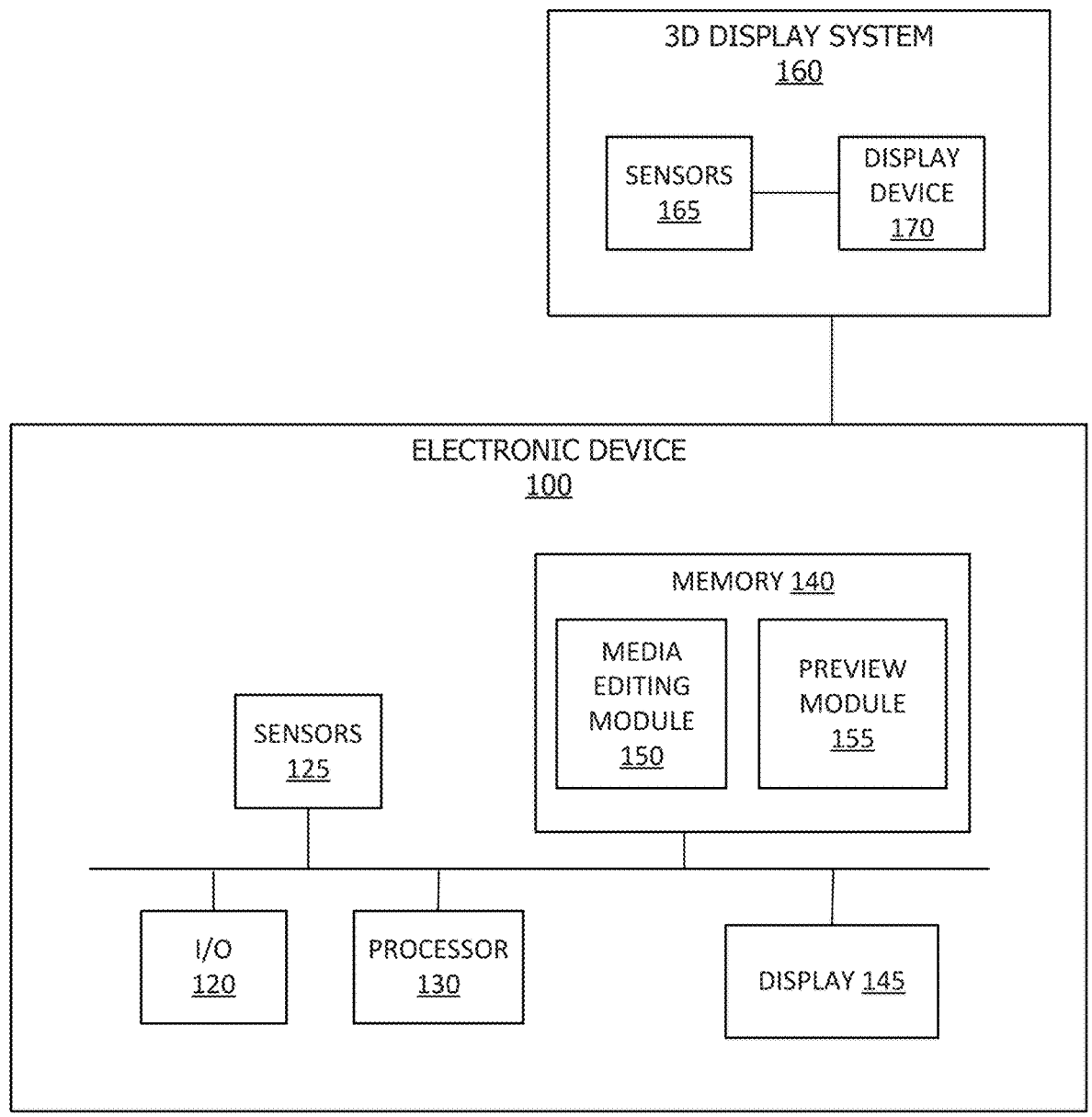
FIG. 1 shows, in block diagram form, a simplified electronic device according to one or more embodiments.

Disclosed is a system, computer readable media, and method for providing a real-time preview of image data to a 3D display device. According to one or more embodiments, the techniques include capturing, processing and overlaying an equirectangular or cubic projection video image onto a virtual spherical or cubic image with respect to the head-mounted display's orientation to generate a composite image; and displaying the composite image in real time at the proper field of view and orientation on a head mounted display. One embodiment of the system may include a head mounted display; a computer running an image or video editing or graphics manipulating program, a "plugin" program module that obtain an image or video output from said video editing or graphics manipulating program, a shared image buffer between the a GPU and secondary program module that can receive the images from the image buffer and output a video or image with properly cropped field of view and orientation based on the real-time orientation data obtained from the head-mounted display.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "3D display device" may include a device that includes a heads-up display or a head-mounted display that provides a spherical 180 or 360 degree view of one or more images.

For purposes of this disclosure, the term "image" may include one or more frames of a still image or a video image.

Referring to FIG. 1, a simplified block diagram of an electronic device 100 is depicted, in accordance with one or more embodiments of the disclosure. Electronic device 100 may be part of a multifunctional device, such as a mobile phone, laptop computer, tablet computer, personal digital assistant, portable music/video player, or any other similar electronic device. According to one or more embodiments, the electronic device 100 may be coupled to a 3D display system 160, either wired or wirelessly.

Electronic Device 100 may include a processor 130. Processor 130 may be a system-on-chip such as those found in mobile devices and include one or more dedicated graphics processing units (GPUs). Further processor 130 may include multiple processors of the same or different type. Electronic Device 100 may also include a memory 140. Memory 140 may each include one or more different types of memory, which may be used for performing device functions in conjunction with processor 130. For example, memory 140 may include cache, ROM, and/or RAM. Memory 140 may store various programming modules during execution, including the media editing module 150 and the preview module 155.

In one or more embodiments, the electronic device 100 may also include a display 150. Display 150 may be any kind of display device, such as an LCD display, LED display, OLED display, or the like. In addition, display 150 could be a semi-opaque display, such as a heads up display or the like. Display 150 may be utilized to display a user interface for one or both of media editing module 150 and preview module 155.

According to one or more embodiments, electronic device 100 may be operatively connected to a 3D display system 160. 3D display system may include similar components to that described with respect to electronic device 100. Further, 3D display system 160 may additionally include one or both of additional sensors 165, and a display device 170. According to one or more embodiments, the sensors 165 may include components that provide location and/or orientation information for the 3D display system 160, such as a gyroscope and/or lensed or lenseless camera. In one or more embodiments, the sensors 165 may provide information regarding a gaze direction of a user. The display device 170 may be, for example, a heads-up display or a head-mounted display that provides a spherical 180 or 360 degree view of one or more images.

Although electronic device 100 and 3D display system 160 are depicted as comprising the numerous components described above, in one or more embodiments, the various components may be distributed across the devices in different ways, or may be distributed across additional devices. Further, additional components may be used, some combination of the functionality of any of the components may be combined.

Media editing module 150 and preview module 155 may include computer readable code executable by one or more processors 130, such as a CPU and/or a GPU. Media editing module may include, for example, a media manipulation application that allows a user to manipulate image data, such as still images or video images. The image data may be digital image data, which may include a single image (in the case of a still image) or multiple image frames that may be chronologically connected (in the case of a video). Digital images and videos generally comprise multiple picture elements (e.g., pixels) arranged in a two-dimensional array. Each pixel may have a color and/or a color value associated with the pixel. Information associated with the location and color of each pixel may be stored and/or used by a computer system to display the digital image and/or video. According to one or more embodiment, image data from the media editing application, may be stored in a GPU buffer. The image data may be stored in the GPU buffer in the form of an equirectangular projection, or other spherical projection.

Preview module 155 may generate preview images of edited image data in real time as a user is editing the image data by media editing module 150. According to one or more embodiments, preview module 155 may generate a preview of the manipulated image data stored in the GPU buffer by the media editing module 150, based on a geometry of the 3D display system 160, and/or a current determined orientation of the 3D display system 160. Thus, in one or more embodiments, the media editing module 150 and preview module 155 may share access to a GPU buffer. The preview module 155 may receive sensor data from sensors 165 or sensors 125 that indicates a position and/or orientation of the 3D display system 160, or a gaze direction of a user utilizing the 3D display system 160, and render the preview image accordingly. The rendered image may be transmitted to 3D display system 160, and the preview image may texture the geometry of the display device 170. The rendered view may be a stereoscopic view or a monoscopic view for the orientation of the 3D display system in real time. Thus, although a 3D view may not be viewable in 3D form by display 145, a 3D version may be viewable in real time by display device 170. Said another way, as an example, a preview of spherical 180 or 360 degree video or still images may be viewable on a 3D display device 170, while display 145 may only be capable of displaying the equirectangular or other type of flattened projection of the image data.

Further, according to one or more embodiments, the preview module 155 may provide a view of a graphical user interface for the media editing module 150 to the display device 170. Thus, because a user's view may be obstructed by the 3D display system, such as when the 3D display system is a head mounted display, the 3D display system may provide a view of the graphical user interface for the media editing module 150. In one or more embodiments, the GUI for the media editing module 150 may only be displayed when it is active. For example, if it is detected that a user is utilizing the media editing module, such as through movement of a cursor or other kinds of user input, then the GUI may be displayed on display device 170. In order to avoid continuous obstruction of the preview of the image data, in one or more embodiments, the GUI may be removed from the display device 170, for example after a predetermined time, or if the user interface is determined to be inactive for a predetermined time.

As noted above, embodiments of the inventions disclosed herein include software. As such, a description of common computing software architecture is provided as expressed in a layer diagram in FIG. 2. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 295 illustrating hardware, which may include CPUs and GPUs or other processing and/or computer hardware. Above the hardware layer is the O/S kernel layer 290 showing an example as O/S kernel 245, which is kernel software that may perform memory management, device management, and system calls (often the purview of hardware drivers). In some embodiments of the disclosure, the vertex and hull shaders may be implemented as driver shaders in the kernel. This is because, as discussed below, many embodiments of the disclosure may be implemented in DX11 systems or hardware and the vertex and hull shaders are not necessary to many of the novel embodiments. The notation employed in the layer diagram of FIG. 2 is generally intended to imply that software elements shown in a layer use resources from the layers below and provide services to layers above. However, in practice, all components of a particular software element may not behave entirely in that manner.

Returning to FIG. 2, layer 285 is the O/S services layer exemplified by O/S services 250. O/S services may provide core O/S functions in a protected environment. In addition, O/S services shown in layer 285 may include frameworks for OpenGL 251, Metal 252, Software Raytracer 253, and a Pure Software Rasterizer 254. These particular examples all relate to graphics and/or graphics libraries and are chosen to illuminate the topic of many embodiments herein, which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 2 may also pass their work product on to hardware or hardware drivers in the lower layers.

Referring again to FIG. 2, OpenGL 251 represents an example of a well-known library and application-programming interface for graphics rendering including 2D and 3D graphics. Metal 252 also represents a published graphics library and framework, but it is lower level than OpenGL 251, supporting fine-grained, low-level control of the organization, processing, and submission of graphics and computation commands, as well as the management of associated data and resources for those commands. Metal also provides for control of compute kernels and shaders through a single API, which is a capability exploited as shown in some embodiments below where the graphics pipeline may include both compute kernels and shaders.

Software Raytracer 253 is software for creating image information based upon the process of tracing the path of light through pixels in the plane of an image. Pure Software Rasterizer 254 refers generally to software used to make graphics information such as pixels without specialized graphics hardware (e.g., using only the CPU). These libraries or frameworks shown within the O/S services layer 285 are only exemplary and intended to show the general level of the layer and how it relates to other software in a sample arrangement (e.g. kernel operations usually below and higher-level Applications Services 260 usually above). In addition, it may be useful to note that Metal 252 represents a published framework/library of Apple Inc. that is known to developers in the art. Furthermore, OpenGL 251 may represent a framework/library present in versions of software either currently or formerly distributed by Apple Inc.

Above the O/S services layer 285 there is an Application Services layer 280, which includes Sprite Kit 261, Scene Kit 262 Core Animation 263, and Core Graphics 264. The O/S services layer represents higher-level frameworks that are commonly directly accessed by application programs. In some embodiments of this disclosure the O/S services layer includes graphics-related frameworks that are high level in that they are agnostic to the underlying graphics libraries (such as those discussed with respect to layer 285). In such embodiments, these higher-level graphics frameworks are meant to provide developer access to graphics functionality in a more user/developer friendly way and allow developers to avoid work with shading and graphics primitives. By way of example, Sprite Kit 261 is a graphics rendering and animation infrastructure made available by Apple Inc. Sprite Kit 261 may be used to animate textured images or "sprites." Scene Kit 262 is a 3D-rendering framework from Apple Inc. that supports the import, manipulation, and rendering of 3D assets at a higher level than frameworks having similar capabilities, such as OpenGL. Core Animation 263 is a graphics rendering and animation infrastructure made available from Apple Inc. Core Animation 263 may be used to animate views and other visual elements of an application. Core Graphics 264 is a two-dimensional drawing engine from Apple Inc. Core Graphics 265 provides 2D rendering for applications.

Above the application services layer 280, there is the application layer 275, which may comprise any type of application program. By way of example, FIG. 2 shows three specific applications: Photo Application 271 (a photo management, editing, and sharing program), Finance Program 272 (a financial management program), and Movie Application 273 (a movie making and sharing program). Application layer 275 also shows two generic applications 270 and 274, which represent the presence of any other applications that may interact with or be part of the inventive embodiments disclosed herein. For example, game applications, communications applications, productivity applications, and utility applications are all common in contemporary computing. Generally, embodiments of the invention employ and/or interact with applications that produce displayable/viewable content. Regarding many embodiments of the disclosure, text editors and software development environments to create kernel or shader source code generally operate in the application layer, but may also have lower level components. Compilers and executable code generators may also operate in the application layer, but in some embodiment may operate as a service to Applications and therefore reside in a lower level either exclusively or in addition to presence in the application layer. Finally, regarding some embodiments of the disclosure, the implementation of the graphics pipeline discussed herein may exist primarily in layer 285 or straddle between two or three of the layers 280, 285 and 290. As noted below, some embodiments of the disclosure contemplate pipeline portions being implemented in hardware. Thus, in these embodiments, the graphics pipeline will extend into the hardware layer (e.g. 295) as a complement to the one or more of the three software layers represented by 290, 285 or 280.

In evaluating O/S services layer 285 and applications services layer 280, it may be useful to realize that different frameworks have higher- or lower-level application program interfaces, even if the frameworks are represented in the same layer of the FIG. 2 diagram. The illustration of FIG. 2 serves to provide a general guideline and to introduce exemplary frameworks that may be discussed later. Furthermore, some embodiments of the invention may imply that frameworks in layer 280 make use of the libraries represented in layer 285 or that software in layer 285 cooperates with drivers or other software in kernel 245. Thus, FIG. 2 provides intellectual reinforcement for these examples. Importantly, FIG. 2 is not intended to limit the types of frameworks or libraries that may be used in any particular way or in any particular embodiment.

Figure 3:
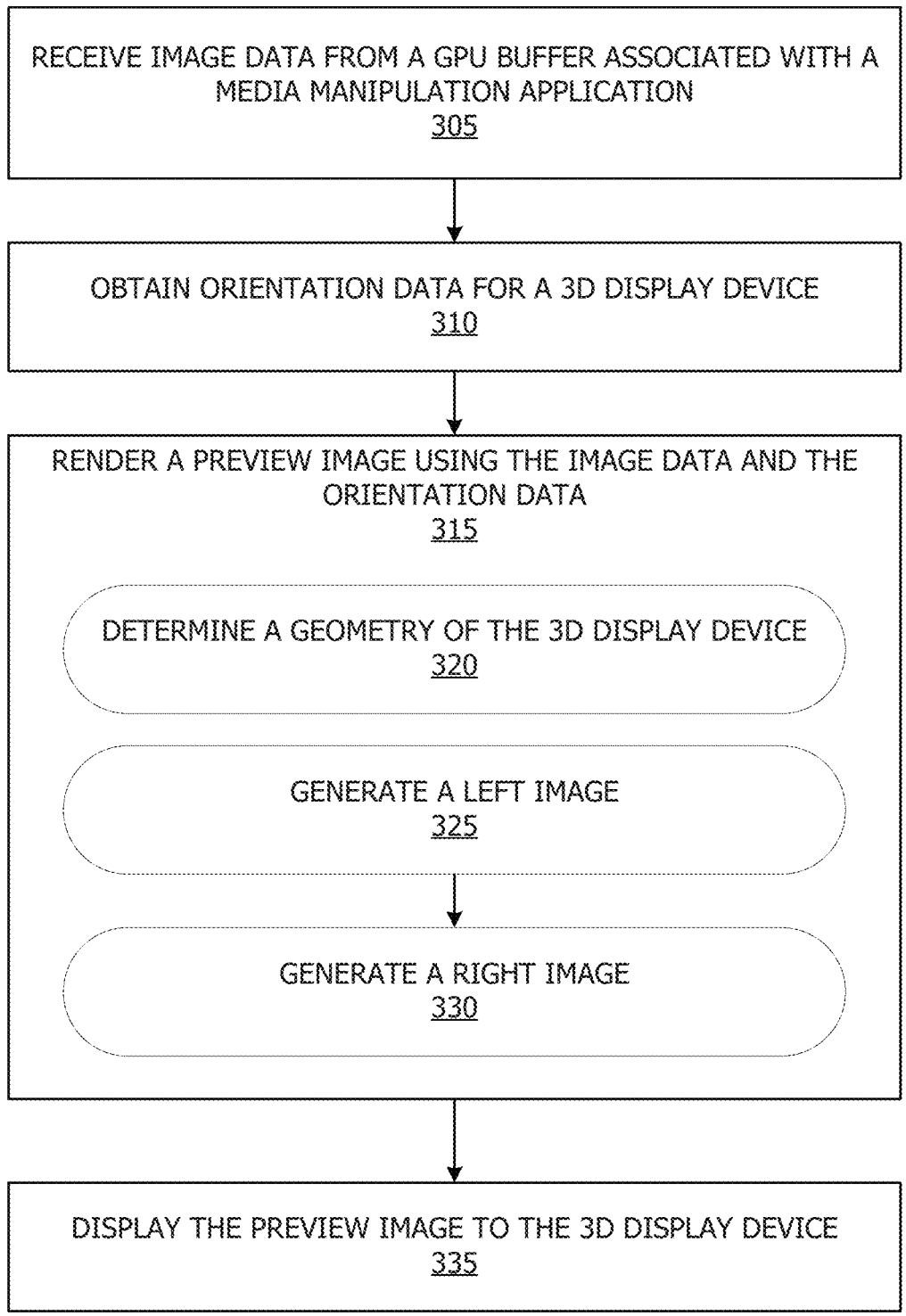
FIG. 3 shows, flowchart form, a method for presenting a preview image by a 3D display device, according to one or more embodiments.

FIG. 3 shows, flowchart form, a method for presenting a preview image by a 3D display device, according to one or more embodiments. The flowchart begins at 305, and image data is received from a GPU buffer associated with a media manipulation application. According to one or more embodiments, the image data may correspond to still images or video images.

The flowchart continues at 310, and the preview module 155 obtains orientation data for a 3D display device. According to one or more embodiments, the orientation data may be derived from data from sensors 125 or sensors 175. The orientation data may indicate a position and/or orientation of the 3D display system 160, and/or a gaze direction of a user utilizing the 3D display system 160.

At 315, the preview module 155 renders a preview image using the image data and the orientation data. According to one or more embodiments, the preview image may be rendered in real time, as the image data is manipulated and stored to the GUI buffer by the media manipulation application, and/or when a change in orientation of the 3D display device 170 is detected.

In rendering the preview image, the preview module 155 may optionally determine a geometry of the display device of the 3D display system at 320. The preview image may be rendered such that it textures the geometry of the display device. Further, in one or more embodiments, the 3D display system 160 may provide a stereoscopic view. Thus, at 325, the preview module 155 may render a left image, and at 330, the preview module 155 may render a right image. In one or more embodiments, the image data may originate from a monoscopic source. In the case that the image data originated from a monoscopic source, a single image may be rendered twice, or may be rendered once and duplicated, for each of the left and right view.

The method concludes at 335, and the preview module causes the preview image to be displayed by the 3D display system 160. According to one or more embodiments, the preview image may be a representative monoscopic or stereoscopic view of the image data as output by the media manipulation application, based on an orientation of the 3D display, in real time.

Figure 4:
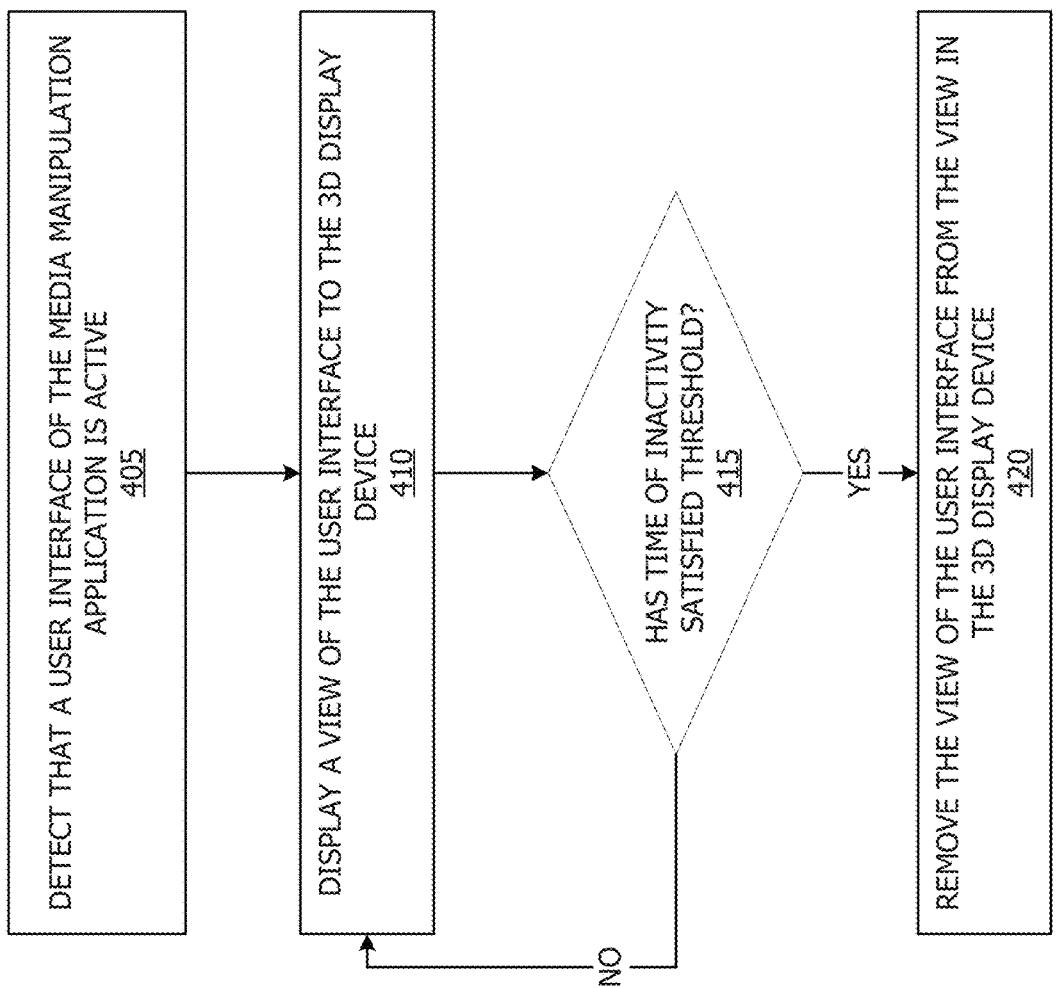
FIG. 4 shows, in flowchart form, a method for presenting a GUI for a media manipulation program by a 3D display device, according to one or more embodiments.

FIG. 4 shows, in flowchart form, a method for presenting a GUI for a media manipulation program by a 3D display device, according to one or more embodiments. For purposes of this example, the preview module 155 may already be rendering and presenting the preview image on the 3D display system 160.

The method begins at 405, and the preview module 155 detects that a user interface of the media manipulation application is active. For example, the preview module 155 may detect user input based on a movement of a cursor or other type of active user input, according to one or more embodiments. The active user interface may indicate that a user is utilizing the media manipulation application to modify image data (which is then passed to the shared GPU buffer). In one or more embodiments, a user may attempt to edit the image data while utilizing the 3D display system 160. However, in one or more embodiments, use of the 3D display system 160 may obstruct a user's view of display 145, where the preview of the image data may normally be presented.

The flowchart continues at 410, and, in response to detecting that the user interface for the media manipulation application is active, the preview module 155, may present a view of the user interface to the 3D display device. In one or more embodiments, the view of the user interface may be rendered according to the geometry and position and/or orientation of the 3D display device 160. The user interface may be a full view of the user interface, as it would be shown on display 145, or it may be a partial view.

A determination is made at 415, regarding whether a time of inactivity has satisfied a threshold. The time of inactivity may be preselected by a user, based on a number of minutes or seconds for example. The time of inactivity may also vary, for example, based on a last utilized function of the media manipulation application, or based on other characteristics of the use of the media manipulation application. If, at 415, a determination is made that the time of inactivity does not satisfy a threshold, then the flowchart continues at 410, and the user interface for the media manipulation application continues to be displayed.

Returning to 415, if a determination is made that the time of inactivity has satisfied a threshold, then the flowchart continues at 420, and the user interface is removed from the 3D display device. Thus, in one or more embodiments, the user interface only obstructs the preview image while a user is modifying the image data using the media manipulation application.

With respect to the flowcharts above, it should be understood that the various steps are only presented in a particular order for purposes of clarity. According to one or more embodiments, the various steps may be performed in a different order, and/or some steps may be performed simultaneously. Further, in one or more embodiments, some steps may be omitted, or additional steps may be added.

Figure 5:
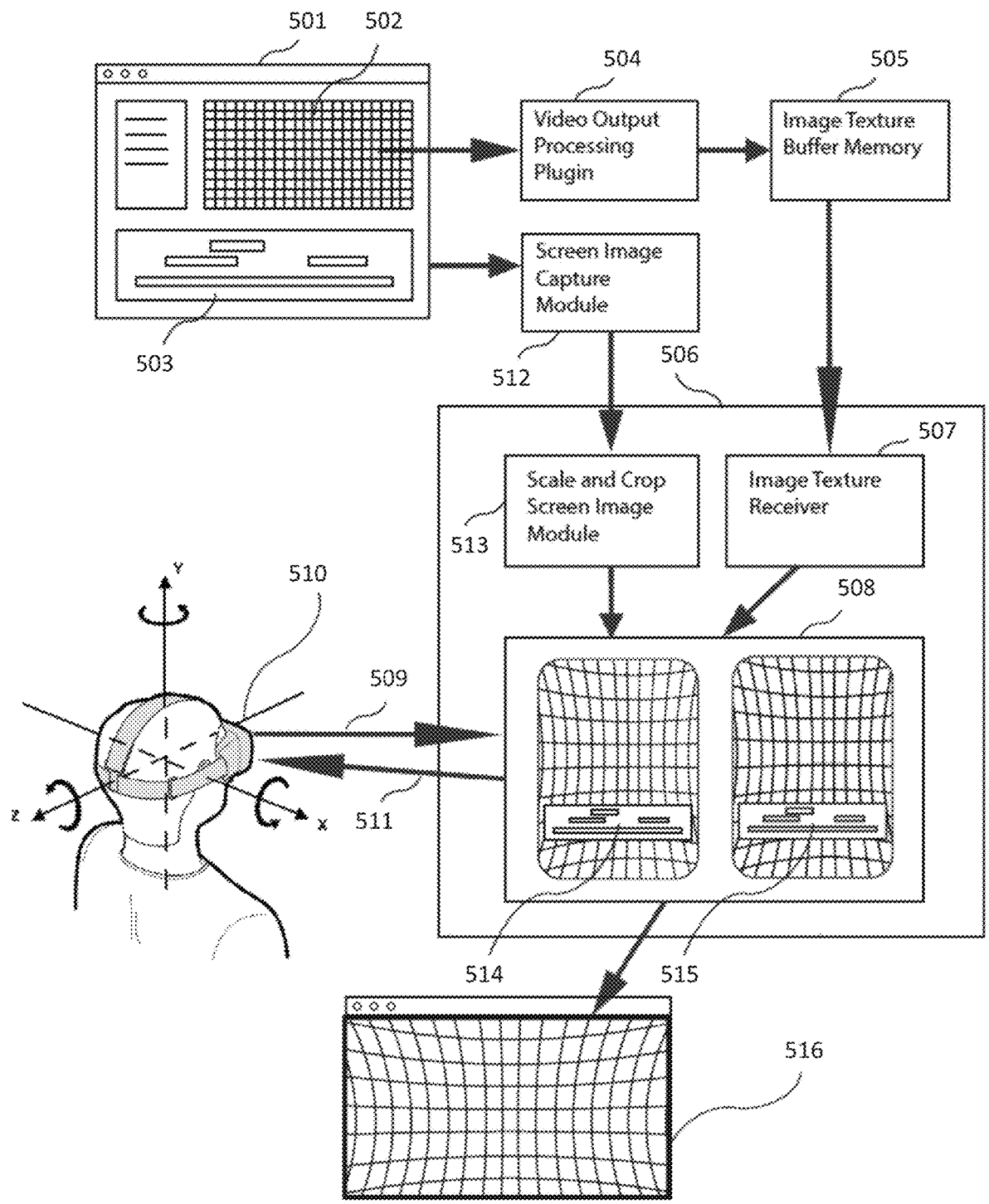
FIG. 5 shows an example for diagram for presenting a preview image by a 3D display device, according to one or more embodiments.

FIG. 5 shows an example for diagram for presenting a preview image by a 3D display device, according to one or more embodiments. FIG. 5 illustrates the user interface of a video or image editing or graphics manipulation software program 501 with an equirectangularly projected spherical image displayed in the canvas 502 and a compositing or editing timeline 503. The image output of the video or image editing or graphics manipulation software program 501 can be output via a video output processing software plugin module 504 and passed to a GPU image buffer shared memory and then passed efficiently to the image receiver 507 of the head-mounted display processing program 506. The 3D image processing routine 508 of the head-mounted display processing program 506 will texture the inside of a virtual sphere or cube with a 3D viewpoint at the center of said sphere or cube. The virtual view for each of the left and right eyes will be accordingly cropped, duplicated (if necessary), distorted and oriented based on the lens/display specifications and received orientation data 509 of the wired or wirelessly connected head-mounted display's 510 orientation sensor data. Once the prepared image is rendered by the 3D image processing routine 508, the image can then be passed to the connected head-mounted display 511 for immediate presentation to the wearer within the head-mounted display.

Additionally, since wearing a head-mounted display will obscure the wearer's view of the UI of the video or image editing or graphics manipulation software program 501, it is also possible to capture the computer display's user interface as an image using a screen image capture software program module 512 and pass it to an image receiver/processor 513 for cropping an scaling before being composited on the left and right eye renders from the 3D image processing routine 508, 514, 515 and then the composited image can be passed to the connected head-mounted display 511 for immediate presentation to the wearer within the head-mounted display.

Further, a redundant view can be displayed in a window 516 on the computer's display so others can see what the wearer of the head-mounted display 510 is seeing, or if a head-mounted display is not available.

According to one or more embodiments, the benefits of this system and/or method in accordance with one or more embodiments can include a dramatic decrease in the amount of time required to align, manipulate, or edit spherical 360 degree video or images. Though embodiments of the present invention are discussed with reference to image data, embodiments of the present invention also apply to audio data. Accordingly, it should be understood that teachings presented herein on image data and image processing are equally applicable to audio data and audio processing. Additionally, image data may be associated with audio data (e.g., in the case of a video with visual and audio components), and may be processed in parallel to or together with the audio data.

Figure 6:
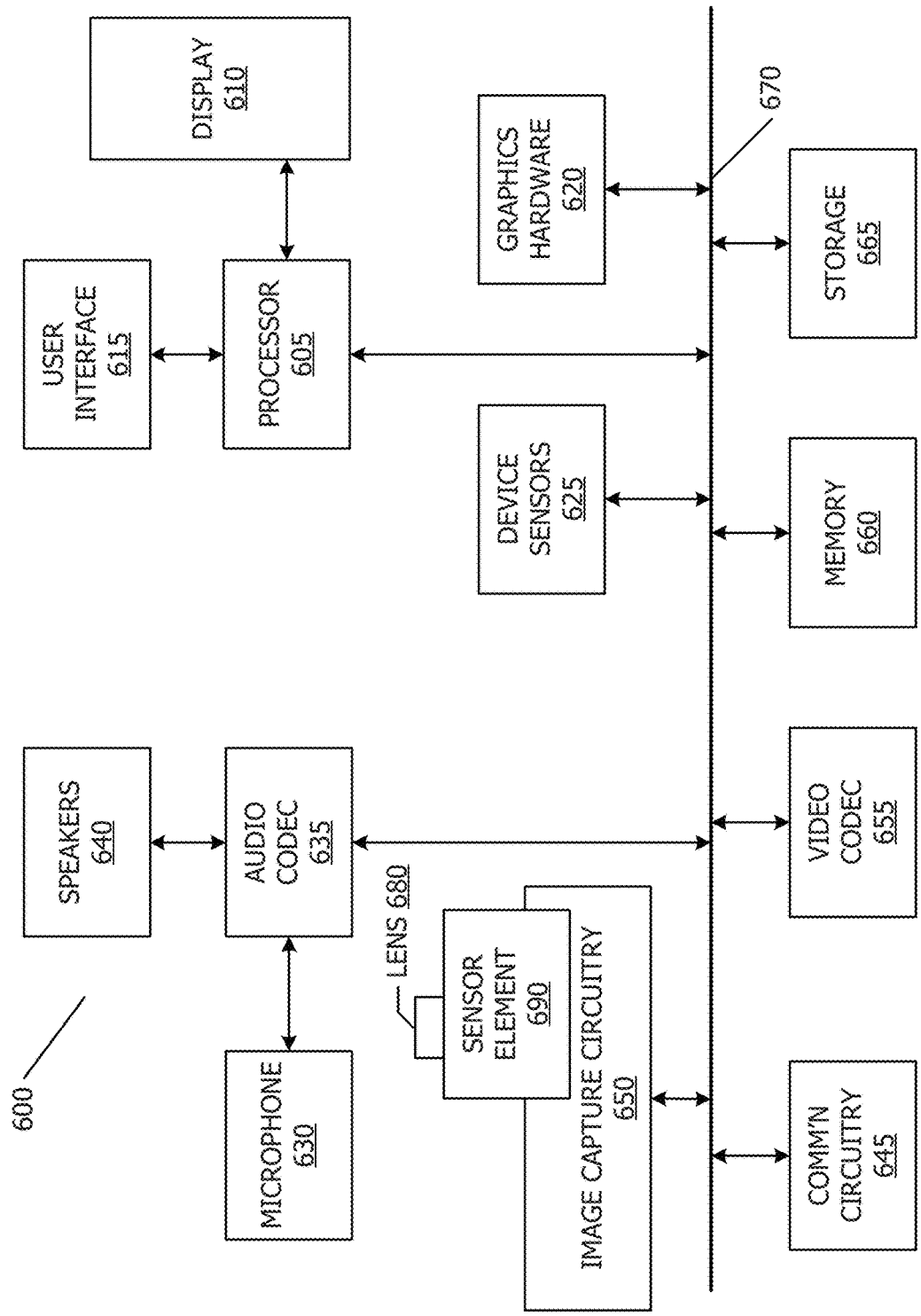
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680. The lens assembly may have an associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The system and methods described above may be implemented in software, hardware, firmware, or any combination thereof. The processes are preferably implemented in one or more computer programs executing on a computer or other programmable device including a processor, a storage medium readable by the processor, and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory computer readable medium comprising computer readable code executable by one or more processors to:
receive image data from a graphics processing unit (GPU) buffer, wherein the GPU buffer stores data modified by a media manipulation application, and wherein the image data is modified by the media manipulation application;
obtain, from orientation sensors on a display device, current orientation data for the display device, wherein the current orientation data is obtained continuously in accordance with movement of the display device;
render a preview image using the image data and the current orientation data, wherein the preview image corresponds to the modification of the image data by the media manipulation application; and
display the preview image using the display device;
while displaying the preview image, obtain updated image data indicating the image data is further modified by the media manipulation application;
obtain updated orientation data from the orientation sensors;
render an updated preview image using the updated image data and the updated orientation data; and
display the updated preview image.

2. The non-transitory computer readable medium of claim 1, further comprising computer readable code executable by the one or more processors to:
obtain user interface image data corresponding to a user interface of the media manipulation application; and
display the user interface image data to the display device.

3. The non-transitory computer readable medium of claim 2, further comprising computer readable code to:
display the user interface image data in response to detected activity in the user interface.

4. The non-transitory computer readable medium of claim 3, further comprising computer readable code to:
detect that the user interface has been inactive for a predetermined time; and
in response to detecting that the user interface has been inactive for the predetermined time, removing the display of the user interface from the display device.

5. The non-transitory computer readable medium of claim 1, wherein the computer readable code to render the preview image further comprises computer readable code to:
obtain a geometry of the display device; and
render the preview image based on the obtained geometry.

6. The non-transitory computer readable medium of claim 5, further comprising computer readable code to:
render a left image corresponding to a view from a left eye;
render a right image corresponding to a view from a right eye,
wherein the computer readable code to display the preview image using the display device further comprise computer readable code to display the left image and the right image.

7. The non-transitory computer readable medium of claim 1, wherein the display device is a head mounted display device.

8. A system for rendering a preview image, comprising:
one or more processors; and
one or more memory devices coupled to the one or more processors and comprising computer readable code executable by the one or more processors to:
receive image data from a graphics processing unit (GPU) buffer, wherein the GPU buffer stores data modified by a media manipulation application, and wherein the image data is modified by the media manipulation application;
obtain, from orientation sensors on a display device, current orientation data for the display device, wherein the current orientation data is obtained continuously in accordance with movement of the display device;
render a preview image using the image data and the current orientation data wherein the preview image corresponds to the modification of the image data by the media manipulation application; and
display the preview image using the display device;
while displaying the preview image, obtain updated image data indicating the image data is further modified by the media manipulation application;
obtain updated orientation data from the orientation sensors;
render an updated preview image using the updated image data and the updated orientation data; and
display the updated preview image.

9. The system of claim 8, further comprising computer readable code executable by the one or more processors to:
obtain user interface image data corresponding to a user interface of the media manipulation application; and
display the user interface image data to the display device.

10. The system of claim 9, further comprising computer readable code to:
display the user interface image data in response to detected activity in the user interface.

11. The system of claim 10, further comprising computer readable code to:
detect that the user interface has been inactive for a predetermined time; and
in response to detecting that the user interface has been inactive for the predetermined time, removing the display of the user interface from the display device.

12. The system of claim 8, wherein the computer readable code to render the preview image further comprises computer readable code to:
obtain a geometry of the display device; and
render the preview image based on the obtained geometry.

13. The system of claim 12, further comprising computer readable code to:
render a left image corresponding to a view from a left eye;
render a right image corresponding to a view from a right eye,
wherein the computer readable code to display the preview image using the display device further comprise instructions to display the left image and the right image.

14. The system of claim 8, wherein the display device is a head mounted display.

15. A method for rendering a preview image, comprising:
receiving image data from a graphics processing unit (GPU) buffer, wherein the GPU buffer stores data modified by a media manipulation application, and wherein the image data is modified by the media manipulation application;
obtaining, from orientation sensors on a display device, current orientation data for the display device, wherein the current orientation data is obtained continuously in accordance with movement of the display device;

rendering a preview image using the image data and the current orientation data, wherein the preview image corresponds to the modification of the image data by the media manipulation application; and displaying the preview image using the display device;

while displaying the preview image, obtaining updated image data indicating the image data is further modified by the media manipulation application;

obtaining updated orientation data from the orientation sensors;

rendering an updated preview image using the updated image data and the updated orientation data; and displaying the updated preview image.

16. The method of claim 15, further comprising:

obtaining user interface image data corresponding to a user interface of the media manipulation application; and displaying the user interface image data to the display device.

17. The method of claim 16, further comprising:

displaying the user interface of the media manipulation application based on detecting activity in the user interface;

detecting that the user interface has been inactive for a predetermined time; and in response to detecting that the user interface has been inactive for the predetermined time, removing the display of the user interface from the display device.

18. The method of claim 15, wherein rendering the preview image further comprises:

obtaining a geometry of the display device; and rendering the preview image based on the obtained geometry.

19. The method of claim 18, further comprising:

rendering a left image corresponding to a view from a left eye;

rendering a right image corresponding to a view from a right eye, wherein displaying the preview image using the display device further comprises displaying the left image and the right image.

20. The method of claim 15, wherein the display device is a head mounted display device.

* * * * *